(12) United States Patent
Pigott

(10) Patent No.: US 6,825,641 B2
(45) Date of Patent: Nov. 30, 2004

(54) HIGH EFFICIENCY ELECTRICAL SWITCH AND DC-DC CONVERTER INCORPORATING SAME

(75) Inventor: John M. Pigott, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 10/349,298

(22) Filed: Jan. 22, 2003

(65) Prior Publication Data

US 2004/0140791 A1 Jul. 22, 2004

(51) Int. Cl.[7] .................................................. G05F 1/56
(52) U.S. Cl. ........................ 323/222; 323/272; 323/282
(58) Field of Search ................................ 323/222, 225, 323/272, 282

(56) References Cited

U.S. PATENT DOCUMENTS

| | | | | |
|---|---|---|---|---|
| 3,699,358 A | * | 10/1972 | Wilkinson | 327/405 |
| 4,616,142 A | * | 10/1986 | Upadhyay et al. | 327/405 |
| 6,316,956 B1 | * | 11/2001 | Oglesbee | 326/10 |
| 6,404,173 B1 | * | 6/2002 | Telefus | 323/272 |
| 6,441,598 B1 | * | 8/2002 | Ivanov | 323/284 |
| 6,563,293 B2 | * | 5/2003 | Marino et al. | 323/272 |

OTHER PUBLICATIONS

"Parelleling Hexfet Power Mosfet's," *Crest Center for Renewable Energy and Sustainable Technology*, EV Archive, AN–941 (v.Int), May 2001.

Baliga, *Modern Power Devices*, John Wiley & Sons, pp. 331–339, c1987.

* cited by examiner

*Primary Examiner*—Jeffrey Sterrett
(74) *Attorney, Agent, or Firm*—Fulbright & Jaworski, LLP (57) ABSTRACT

A high efficiency electrical switch comprised of two parallel connected FETs have different switch transition times. The faster FET is turned on first during the switch turn-on transition, and is turned off last during the switch turn-off transition. A high efficiency DC-DC converter employing the high efficiency switch is also presented.

11 Claims, 6 Drawing Sheets

HIGH EFFICIENCY ELECTRICAL SWITCH AND DC-DC CONVERTER INCORPORATING SAME

BACKGROUND OF THE INVENTION

1. Field of the Invention

The invention relates generally to the field of electrical switches and more particularly to electrical switches used in switched-mode DC-DC converters.

2. Discussion of the Related Art

Electrical loads are often required to be powered by one or more direct current (DC) voltages at regulated values that are derived from an available DC voltage source having a different and often unregulated value. For example, electrical equipment in a spacecraft is often powered by a single unregulated DC voltage source, for example, a battery bank and/or solar panel, whereas the various pieces of electrical equipment in the spacecraft may require different regulated voltages.

Similarly, modern electrical devices such as, for example, computers, cellular phones, personal digital assistants (PDAs) and the like, include electrical components that are required to be powered by regulated DC supply voltages of specific values, when the only electrical power available may be from a different DC voltage source having a voltage level different from the DC supply voltage or voltages desired. Further, the available DC voltage source may be substantially unregulated. For example, in a desk-top computer, an unregulated DC voltage is typically derived from the alternating current (AC) mains by rectification and crude filtering to produce a voltage source having an average DC value with a substantial ripple corresponding to the mains AC frequency. This unregulated voltage is typically different in magnitude from the voltage or voltages required to power the various components in the computer. In another example, in battery operated devices, such as lap-top computers, cellular phones or PDAs, the voltage supplied by the battery may vary substantially over time, and it may be of a different value than the voltage or voltages required to power the individual components of the device.

DC-DC converters are used in such situations to supply one or more regulated supply voltages from an unregulated voltage source. In such DC-DC converters, of great concern is conversion efficiency, which is defined as the ratio of converter output power to input power.

Switched-mode DC-DC converters are often used in such applications, as they provide improved efficiency over dissipative conversion methods. In such switched-mode DC-DC converters, an unregulated input voltage is converted into a periodic pulse waveform that has an average value which varies with the ratio of the pulse width to the pulse period. The average value of the pulse waveform may be extracted using filtering techniques, typically including the use of passive filtering components such as capacitors and inductors.

As a practical matter, the use of a high switching frequency in a switched-mode DC-DC converter is desirable because it permits a reduction in the size and weight of the passive filtering components. Switching frequencies in excess of 500 kHz in switched-mode DC-DC converters are common, and the use of large field effect transistors (FETs) as the switching element in the DC-DC converters has facilitated the increase in switching frequency. However, as the switching frequency increases, switching losses during the transition of the switch from off to on and from on to off also increase. This is due to the fact that during these transitions, the current passing through the switch and the voltage across the switch both have positive values resulting in a positive voltage-times-current (VI) product, and thus power dissipation. These are known as switch transition losses and are undesirable because they degrade conversion efficiency.

Present approaches used in an attempt to reduce the switch transition losses in switched-mode DC-DC converters include the creation of special low gate resistance FETs, however, this requires a semiconductor manufacturing technology change. Another approach is the use of complex negative biasing on the gate of the FET during switch transitions in order to extract gate charge faster thus improving switch transition speed and reducing transition losses. However, this approach requires the use of complicated gate drive circuitry. Yet another approach in an attempt to reduce losses is to employ multiple discrete FETs in parallel with a common gate drive in order to reduce the on resistance of the parallel combination. However, this approach does not reduce switching times and does not reduce switch transition losses. Finally, switch transition losses may be reduced simply by reducing the switching frequency resulting in fewer switch transitions during a given time period. However, this necessarily results in the undesirable increase in size, weight and cost of the passive filtering components used in the converter.

Thus each of these prior attempts to reduce the switch transition losses has its drawbacks, and it would be preferable to reduce switch transition losses in DC-DC converters without changing the switch manufacturing technology, without the use of complex gate biasing techniques, and without reducing switching frequency.

SUMMARY OF THE INVENTION

There is a need for the following embodiments. Of course, the invention is not limited to these embodiments.

One embodiment of the invention is a DC-DC converter for converting an unregulated input voltage into at least one regulated output voltage, the converter having an inductor, a capacitor coupled to the inductor, a rectifier coupled to the inductor and capacitor; and a controllable electrical switch, coupled to the inductor the capacitor and the rectifier, the electrical switch including a first FET having gate, drain and source terminals, and having a first switching time, and a second FET having a gate terminal, a drain terminal coupled to the drain terminal of the first FET, a source terminal coupled to the source terminal of the second FET, a switching time of the first FET being less than a switching time of the second FET. Different switching times may be realized by use of FETs with different channel areas, different gate areas, different gate capacitance, or different gate drive circuits, or a combination of one or more of these features.

In accordance with another embodiment of the invention, an electrical switch includes a first FET having gate, drain and source terminals, and having a switching time, and a second FET having a gate terminal, a drain terminal coupled to the drain terminal of the first FET, a source terminal coupled to the source terminal of the first FET, the switching time of the first FET being less than the switching time of the second FET.

Yet another embodiment of the invention includes a method of operating a switched-mode DC-DC converter, having an inductor, a capacitor coupled to the inductor, a rectifier coupled to the capacitor and inductor, and first and second parallel-connected FETs coupled to the inductor the capacitor and the rectifier, a switching time of the first FET being less than a switching time of the second FET. The method comprises turning the first FET on before turning the second FET on during a switch on transition, and turning the second FET off before turning the first FET off during a switch off transition.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer understanding of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein.

DETAILED DESCRIPTION

FIGS. 1–4 illustrate simplified schematic drawings of exemplary embodiments of DC-DC converters using the present invention. In each of these converters, a controller 101 is used to sense the magnitude of output voltage $V_o$ measured across load 102, and functions to maintain the magnitude of the output voltage $V_o$ at a substantially constant value despite the magnitude of input voltage $V_I$, by varying the duty ratio of switch 103. The duty ratio is defined as the fraction of time that switch 103 is closed. Controller 101 determines the switch duty ratio by generating a digital (two-level) switch drive signal 104 which uniquely defines the state of switch 103 in either the open or closed state.

Through this method, the output voltage, $V_o$, is maintained at a substantially constant value, despite variations in input voltage $V_I$. Each of the simplified DC-DC converters shown in FIGS. 1–4 include passive filtering components, including inductor 106 and capacitor 107. In addition, each of the DC-DC converters also includes rectifier 108. Switch 103, inductor 106, capacitor 107 and rectifier 108 are coupled together differently in each of the DC-DC converters shown in FIGS. 1–4 in order to satisfy different conversion requirements given the desired output voltage $V_o$, the load 102, and the magnitude and range of variation of input voltage $V_I$.

Figure 1:
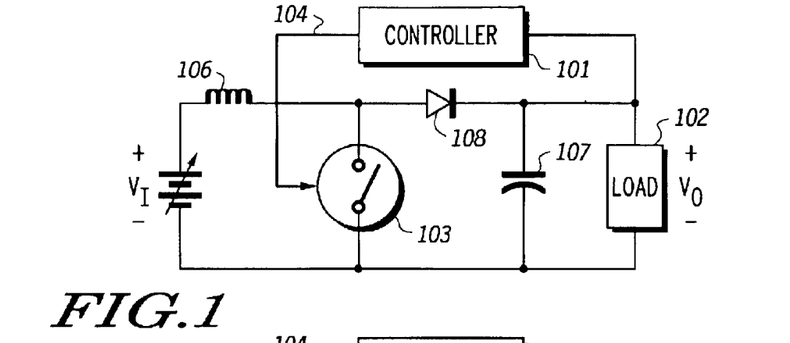
FIGS. 1–4 are various exemplary types of DC-DC converters that may use the present invention.
Figure 2:
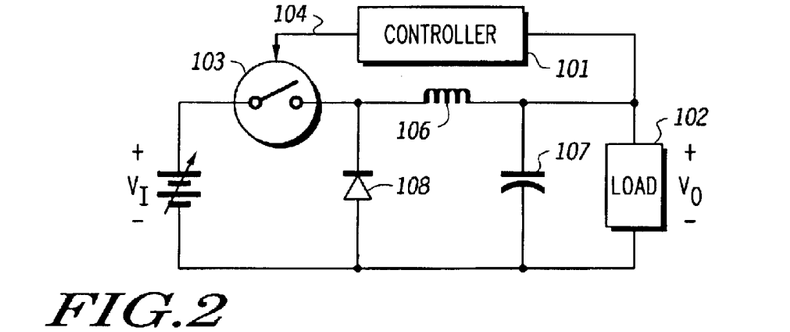

In particular, FIG. 1 is a boost-type DC-DC converter that produces a regulated output voltage $V_o$ that is greater in magnitude than the magnitude of the input voltage $V_I$. FIG. 2 is a buck-type DC-DC converter that produces a regulated output voltage $V_o$ that is less in magnitude than the magnitude of the input voltage $V_I$.

Figure 3:
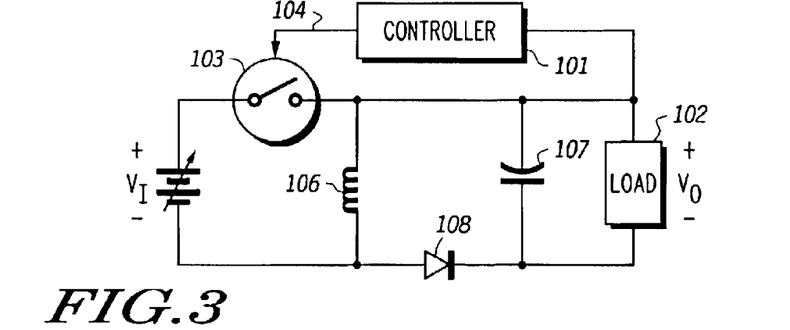

FIG. 3 is a buck-boost-type DC-DC converter, also known as a flyback converter, that produces a regulated output voltage $V_o$ that is either greater or less in magnitude than a magnitude of the unregulated input voltage $V_I$, depending on the duty ratio of switch 103.

Figure 4:
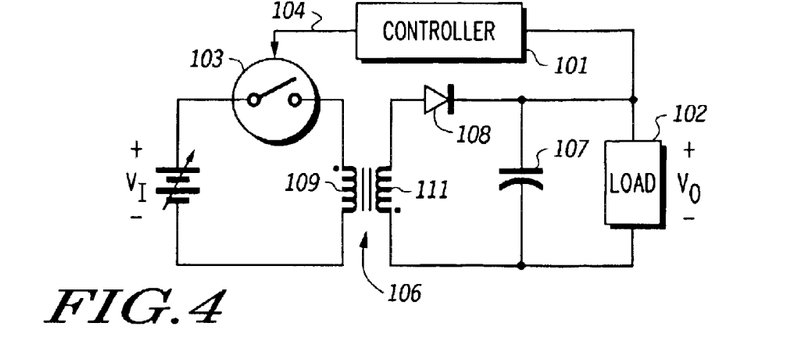

Finally, FIG. 4 is an isolated buck-boost type DC-DC converter including an inductor 106 that is in the form of an inductive (for example, air gapped) transformer including primary winding 109 and secondary winding 111. This provides additional flexibility in the design of the DC-DC converter, compared to the topology of FIG. 3, and also provides galvanic isolation between output voltage $V_o$ and input voltage $V_I$, which is desirable in many applications.

As mentioned above, controller 101 provides a two-level switch drive signal 104 which is used to determine the state of switch 103 (either open or closed) in each of the DC-DC converters in FIGS. 1–4. Controller 101 may be, for example, a pulse width modulator, a pulse frequency modulator, or any other type of modulator that produces a two-level switch drive signal.

In addition, it should be noted that while particular DC-DC converter configurations have been presented with reference to FIGS. 1–4, other switched-mode DC-DC converters are also contemplated by the present invention, including, for example, the Cuk converter or any other type of switched-mode DC-DC converter. Further, although each of the simplified DC-DC converters shown in FIGS. 1–4 are shown to produce a single regulated output voltage $V_o$, multiple regulated output voltages may be produced using known techniques, without departing from the spirit and scope of the present invention.

Figure 5:
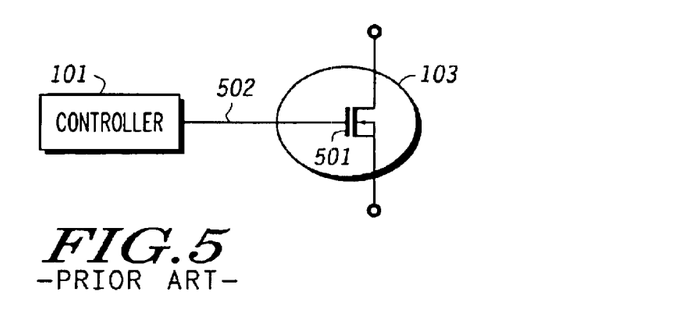
FIG. 5 is a conventional electrical switch used in a DC-DC converter.

Referring now to FIG. 5, presented is an example of a conventional switch 103. It is known to use a metal oxide silicon FET (MOSFET) 501 having a gate 502 driven by controller 101, and used as electrical switch 103 in the DC-DC converters of FIGS. 1–4. Use of such MOSFETs facilitates higher switching frequencies, which results in smaller inductors 106 and capacitors 107 in a DC-DC converter, as mentioned above. However, the switch transition losses in DC-DC converters using single MOSFETs result in excessive power dissipation as switching frequency increases thus placing a limit on switching frequency and degrading conversion efficiency.

Figure 6:
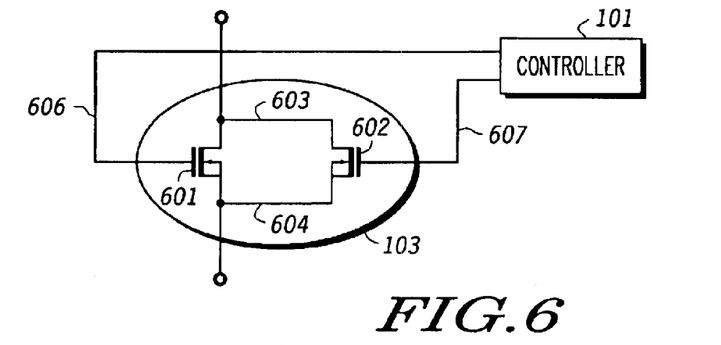
FIG. 6 is a high-efficiency electrical switch usable in a DC-DC converter, in accordance with the present invention.

In accordance with the present invention, as shown in FIG. 6, electrical switch 103 is comprised of two different FETs 601 and 602. FETs 601 and 602 may be any type of FET, including, for example, MOSFETs. The drains of each of the FETs are connected in common at node 603, and the sources of each of the FETs are connected in common at node 604. The gates 606, 607 of FETs 601, 602 are not directly connected and are driven independently by controller 101, in a manner explained in more detail below. In accordance with the present invention, FET 601 has a shorter switching time than FET 602. As used herein, switching time includes the transition of a switch from the off state to the on state as well as the transition from on to off. A short transition time equates to a fast switch transition, and a long transition time equates to a slow switch transition.

This difference in switching time may be accomplished using several techniques. For example, FET 601 may have a smaller channel area than FET 601. In the alternative, FET 601 may have a smaller gate area than FET 601. In another alternative, FET 601 may have a smaller gate capacitance than FET 601. Yet another alternative is to provide FET 601 with a more robust gate drive than FET 602, thus introducing and removing gate charge faster during switch transitions. In addition, one or more of these techniques may be combined. Using one or more of these alternatives, in accordance with the present invention, FET 601 will have shorter switching times in the off-on transition and in the on-off transition than FET 602.

In accordance with one embodiment of the present invention, the channel areas of FETs 601 and 602 are different. Preferably, a ratio of a channel area of FET 601 is in the range of 0.1 to 0.9 of the channel area of FET 602, and even more preferably within the range of 0.2 to 0.5. In other words, in this embodiment, the channel area of FET 601 is smaller than the channel area of FET 602. As a result, FET 601 will have a smaller gate capacitance and thus a shorter switch transition time than FET 602. On the other hand, since FET 602 has a larger channel area than FET 601, FET 602 will have a greater continuous current carrying capacity than FET 601. Thus the parallel combination of small channel area FET 601 and large channel area FET 602 results in an electrical switch 103 with a combination of short transition time resulting in low switch transition losses, while maintaining a high current carrying capacity.

In addition, the gates 606 and 607 are driven by controller 101 so that when electrical switch 103 is turned on, small channel area FET 601, is turned on before large channel area FET 602 is turned on. In this manner, when electrical switch 103 is turning on, FET 601, having a short switching time, turns on first, and the shorter switching time permits a more rapid transition from off to on. Then, after a delay, transistor 602, having a longer switching time, turns on, thus carrying most of the current passing through electrical switch 103 while electrical switch 103 is in the on state.

In a similar manner, when electrical switch 103 is turned off, controller 101 functions so that long switching time FET 602 is turned off first, followed by short switching time FET 601. For example, gate 607 may be turned off first by controller 101, and after a delay, gate 606 is turned off. In this manner, when electrical switch 103 transitions from an on state to an off state, smaller channel area FET 601 is turned off after larger channel area FET 602, thus providing a shorter transition from on to off for electrical switch 103.

The purpose of the delays between switching the FETs 601, 602 is to ensure that the transition time is determined by the switching time of the faster FET 601, while the overall on-resistance of the switch is determined by the parallel combination of fast and slow FETs 601, 602. In one embodiment, the delay is predetermined by controller 101 to ensure that the fast FET 601 has fully completed switching before the slow FET 602 switches. In another embodiment, controller 101 may monitor the transition of fast FET 601 and switch the slow FET 602 when controller 101 has determined FET 601 has switched. In accordance with yet another embodiment of the invention, when switching on, there may be no reason to have any built-in delay as the faster FET 601 will transition faster and determine the overall switching time of the switch 103. When switching off, an optimal delay would have the fast FET 601 begin to switch off in such a way that it becomes off at the substantially the same time that the slow FET 602 also switches off. In other words, the off transition of the fast FET 601 is begun while the slow FET 602 is turning off, such that both the fast and slow FETs 601, 602 arrive at the off state substantially simultaneously.

Figure 7:
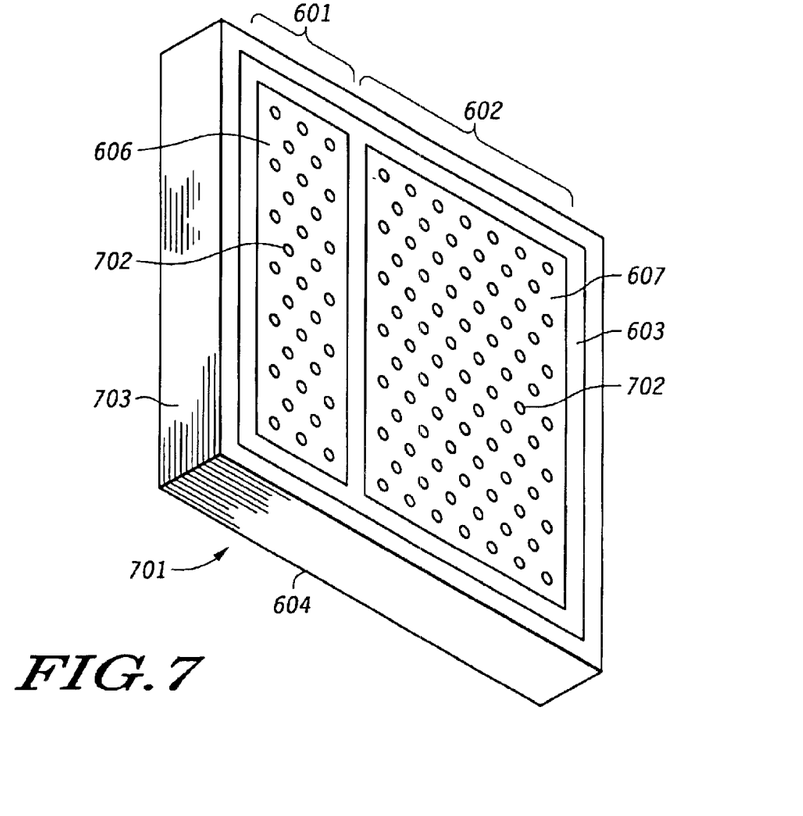
FIG. 7 is an integrated high-efficiency electrical switch, in accordance with one embodiment of the invention.

Referring now to FIG. 7, shown is an example of an integrated circuit (IC) embodiment 701 of the high-efficiency electrical switch of the present invention. IC 701 is based on known vertical channel FET integrated circuit technology, such as that employed in the hexagonal cell FET (HEXFET) available from International Rectifier, and the high density TMOS (HDTMOS) FET available from the On Semiconductor Corporation. In accordance with the present invention, IC 701 includes a semiconductor substrate 703 having first and second major surfaces. Source terminal 603 is formed on the first major surface of semiconductor substrate 703, and first and second gate terminals 606, 607, are also formed on the first major surface of semiconductor substrate 703. A common drain terminal 604 is formed on the second major surface of semiconductor substrate 703. In a known manner, individual cells 702 are formed in the first major surface of semiconductor substrate 703, thereby forming a plurality of individual MOSFETs with channels extending vertically from the source 603 on the first major surface of semiconductor substrate 703 to the drain 604 on the second major surface of semiconductor substrate 703.

In accordance with this exemplary embodiment of the invention, separate gates 606, 607 are provided, and these gates have different areas, thus providing two parallel-connected, independently-controllable MOSFETs on the same IC 701. One of the MOSFETs 601 has a smaller gate area and thus a smaller gate capacitance and a smaller channel area than those of larger MOSFET 602. As a result, MOSFET 601 will have shorter on and off switching times that MOSFET 602. At the same time, FET 601 and FET 602 share common source and drain terminals.

Figure 8:
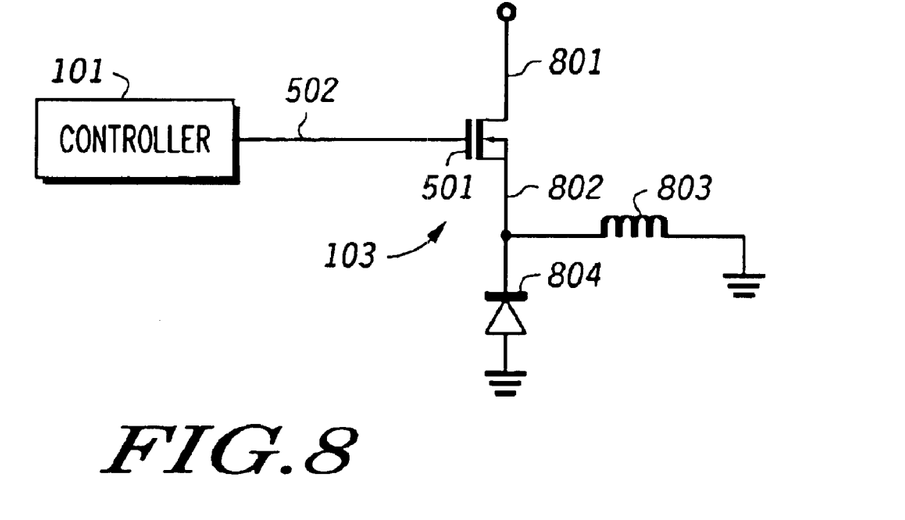
FIGS. 8 and 9 are schematic drawings of circuits used to illustrate some advantages of the present invention.

To illustrate the advantages of the present invention, simulated comparative examples are provided with reference to FIGS. 8–12. In FIG. 8, a conventional MOSFET 501 is shown having a drain 801, source 802, and gate 502 terminals. Gate 502 is driven by controller 101 to turn MOSFET 501 on and off. The drain 801 of MOSFET 501 is connected to a constant DC voltage source +V, and the source 802 of MOSFET 501 is connected to inductor 803 and the cathode of rectifier 804, in order to simulate the switching environment of electrical switch 103 in FIGS. 1–4.

Figure 9:
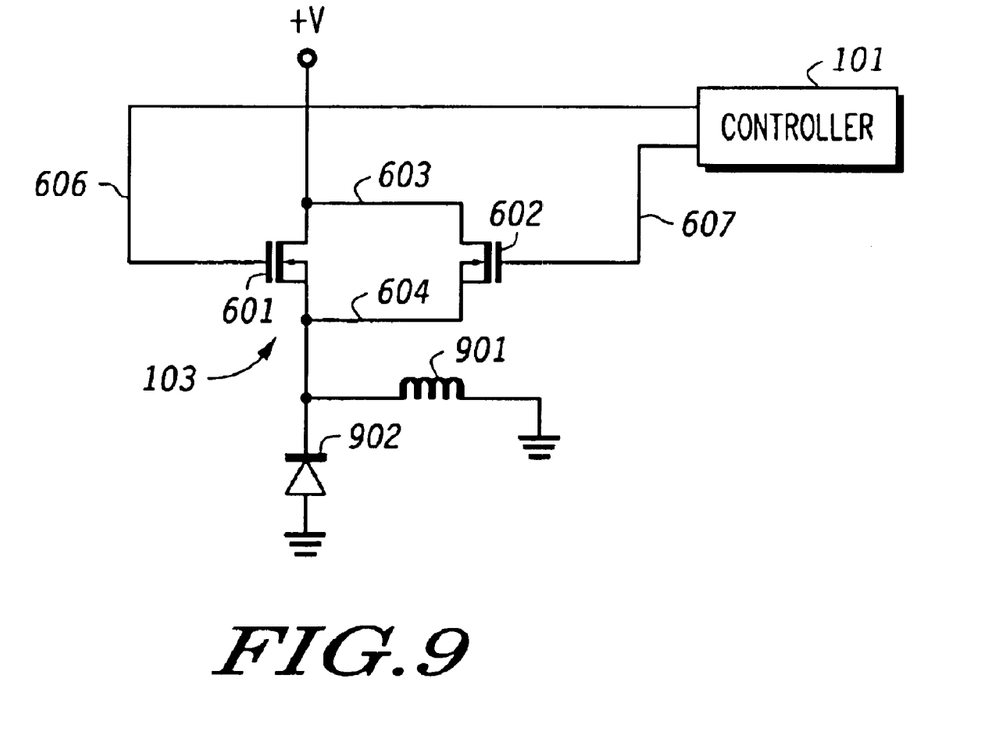

Referring now to the circuit of FIG. 9, in accordance with an embodiment of the present invention, electrical switch 103 is constructed of two independently driven MOSFETs 601, 602. In this comparative example, the channel area of MOSFET 601 is smaller than the channel area of MOSFET 602, and a ratio of the channel areas of MOSFETs 602 and 601 is 0.25. As a result, MOSFET 601 has a shorter switch transition time than MOSFET 602. The drains of MOSFETs 601 and 602 are connected in common to node 603 which is connected to constant DC voltage source +V. The sources of MOSFETs 601 and 602 are also connected in common at node 601 and are connected to inductor 901 and the cathode of rectifier 902, once again to simulate the switching environment of electrical switch 103 in FIGS. 1–4.

The gates 606, 607 of transistors 601, 602 are driven independently by controller 101 so that small channel area MOSFET 601 is turned on before large channel area MOSFET 602 when electrical switch 103 turns on, and so that large channel area MOSFET 602 is turned off before small channel area MOSFET 601 when electrical switch 103 turns off.

For an accurate comparison, the channel area of MOSFET 501 (FIG. 8) is the same as the sum of the channel areas of MOSFETs 601 and 602 (FIG. 9). In addition, the value of inductors 803 and 901 are the same (4.7 microHenry), the characteristics of rectifiers 804 and 902 are identical, and the value of voltage source +V is the same (+5 Volts).

Figure 10:
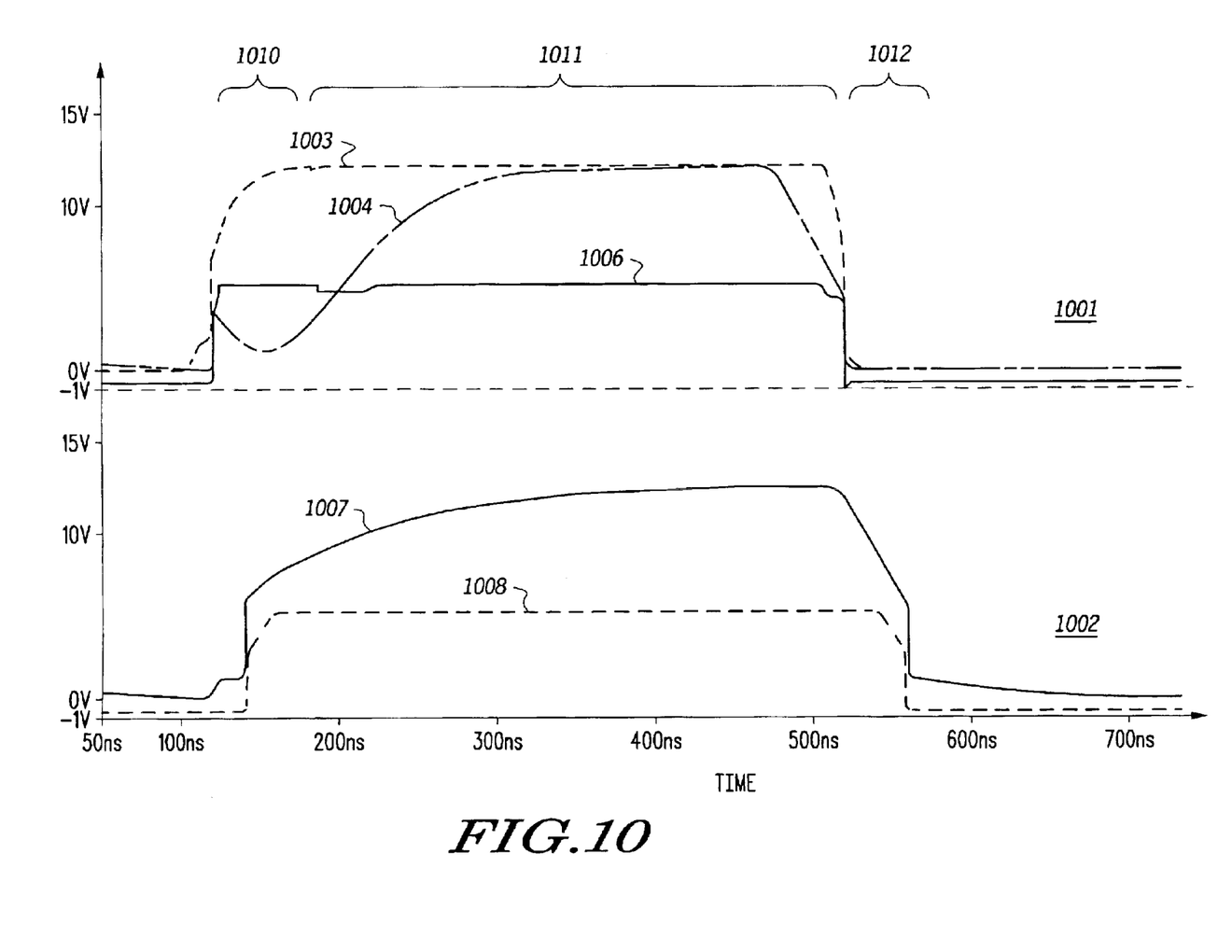
FIGS. 10–12 are graphs of waveforms taken from the circuits of FIGS. 8 and 9, illustrating advantages of the present invention.
Figure 11:
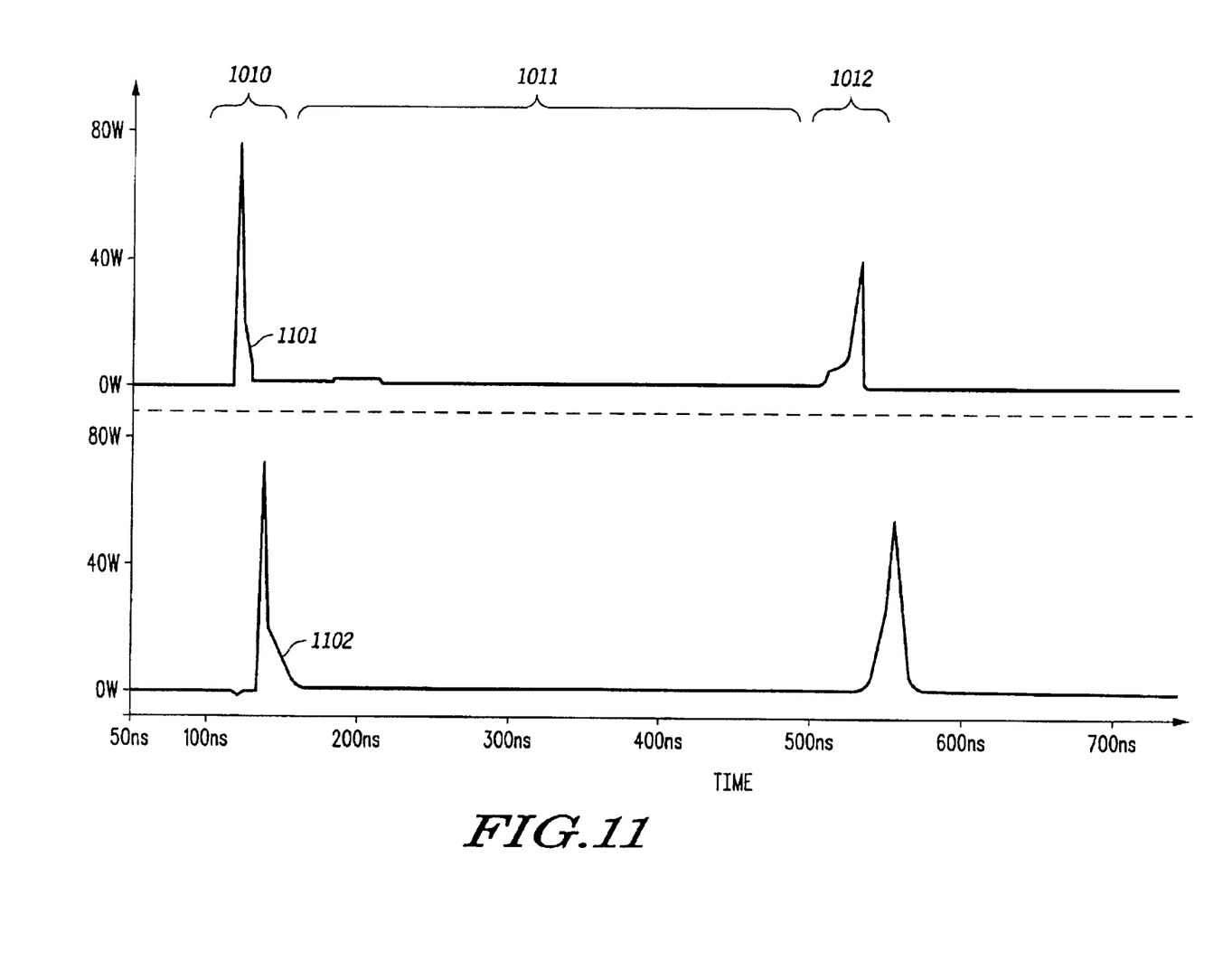
Figure 12:
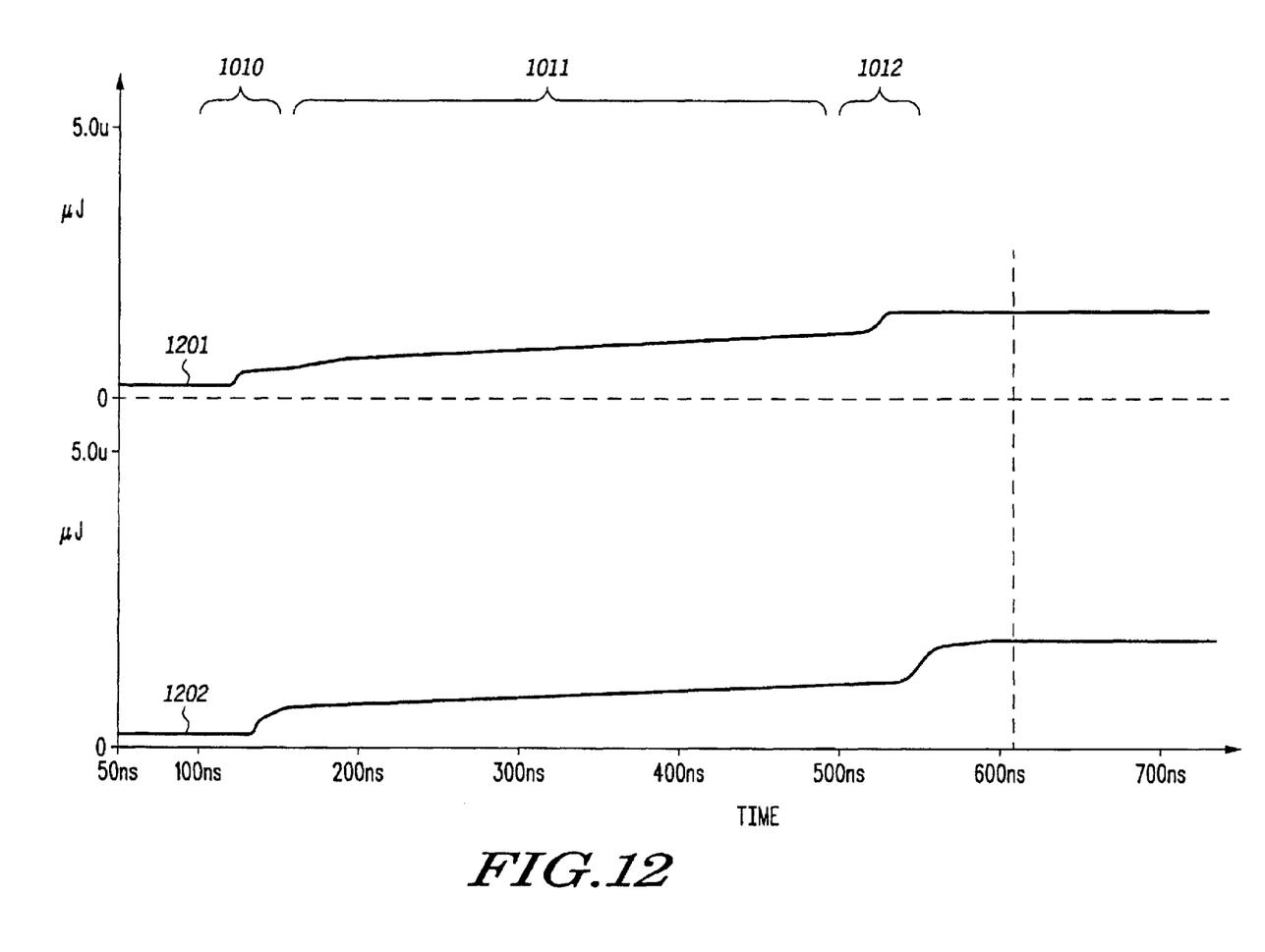

FIGS. 10, 11 and 12 present graphs of simulated waveforms for the circuits of FIGS. 8 and 9, using SPICE simulation software. Referring to FIG. 10, the traces of top graph 1001 are voltages taken from nodes within the circuit of FIG. 9, and the traces of bottom graph 1002 are voltages taken from nodes within the circuit of FIG. 8. The time axes of the graphs in each of FIGS. 10, 11 and 12 are all identical. In the graphs of each of FIGS. 10, 11 and 12, region 1010 is the transition from the off state to the on state for electrical switch 103, region 1011 is the on state of electrical switch 103, and region 1012 is transition from the on state to the off state for electrical switch 103.

Referring to FIG. 10, trace 1003 is the gate voltage of small channel area FET 601, trace 1004 is the gate voltage of large channel area FET 602, and trace 1006 is the voltage of the common sources of FETs 601 and 602, taken at node 604, relative to ground. As can be seen from the traces, the gate of small channel FET 601 is driven before the gate of large channel area FET 602 by controller 101 during the turn-on transition 1010, and the gate of FET 601 is driven longer than the gate of large channel area 602 during the turn-off transition 1012.

In the bottom graph 1002 trace 1007 is the gate voltage applied at node 502 to FET 501 by controller 101, and trace 1008 is the source voltage of FET 501 taken at node 802 relative to ground.

Referring now to FIG. 11, top trace 1101 is the product of the current supplied by voltage source +V multiplied by the voltage difference between the common drain node 603 and the common source node 604, and presents a representation of the instantaneous power dissipation in the electrical switch 103 of FIG. 9 during an off to on transition 1010, an on state 1011, and during an on to off transition 1012. In contrast, trace 1102 is a graph of the product of the current supplied from voltage source +V multiplied by the voltage difference between the drain and source 801, 802 of FET 501, and represents the instantaneous power dissipation within electrical switch 103 of FIG. 8 during the same transitions.

Comparing trace 1101 with trace 1102 of FIG. 11, it can be seen that while the peak power dissipation during the turn-on interval 1010 of switch 103 is approximately the same for each circuit, the width of the power dissipation spike is much less for the circuit of FIG. 9. Similarly, both the width and the peak magnitude of the power dissipation spike during the turn-off interval 1012 are smaller for the trace 1101 of the present invention, compared to the trace 1102 of the conventional electrical switch.

This is more clearly depicted in FIG. 12, wherein traces 1201 and 1202 represent the respective integrals of traces 1101 and 1102 of FIG. 11. The vertical axes of each of the graphs in FIG. 12 are in microjoules ($\mu J$). Thus, the graphs of FIG. 12 reflect the accumulated power dissipation throughout the transition from off to on, 1010, the on time, 1011, and the transition from on to off, 1012.

Making the reasonable assumption that the traces of FIGS. 10, 11 and 12 represent the environment of switch 103 (FIGS. 1–4) in a 6 Volt in, 2 Volt out, 10 Ampere out application having a switching frequency of 1 MHz, in the conventional electrical switch depicted by trace 1102, the losses during the on time 1011 are approximately 0.5 $\mu J$/cycle, or 0.5 Watts, and the switch transition losses (the losses during transition times 1010 and 1012) are approximately 0.9 Watts, for a total power dissipation of 1.4 Watts. In contrast, using the present invention, the losses during the on time 1011 remain approximately the same at 0.5 Watts, but the switch transition losses are reduced to less than 0.5 Watts, for a total power dissipation of 1.0 Watts. This represents a power dissipation savings of 30% compared to the conventional electrical switch in the same environment.

The terms a or an, as used herein, are defined as one or more than one. The term plurality, as used herein, is defined as two or more than two. The terms including and/or having, as used herein, are defined as comprising (i.e., open language). The term coupled, as used herein, is defined as connected, although not necessarily directly, and not necessarily mechanically.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A switched-mode DC-DC converter for converting an unregulated input voltage into at least one regulated output voltage, comprising:

an inductor;

a capacitor coupled to the inductor;

a rectifier coupled to the inductor and capacitor;

a controllable electrical switch coupled to the inductor the capacitor and the rectifier, the electrical switch including a first FET having gate, drain and source terminals, and having a first switching speed, and a second FET having a gate terminal, a drain terminal coupled to the drain terminal of the first FET, a source terminal coupled to the source terminal of the second FET, a switching time of the first FET being less than a switching time of the second FET; and a controller operating to turn the first FET on before the second FET during a turn on transition of the controllable electrical switch, and to turn the first FET off after the second FET during a turn off transition of the controllable electrical switch.

2. The switched-mode DC-DC converter of claim 1, the controller operating to sense a magnitude of said at least one regulated output voltage, and to control the gate terminals of the first and second FETs to maintain said at least one regulated output voltage at a desired magnitude.

3. The switched-mode DC-DC converter of claim 2, the controller comprising a pulse frequency modulator.

4. The switched-mode DC-DC converter of claim 2, the controller comprising a pulse width modulator.

5. The switched-mode DC-DC converter of claim 1, the inductor, capacitor, rectifier and controllable electrical switch coupled to form a buck-boost converter.

6. The switched-mode DC-DC converter of claim 1, the inductor, capacitor, rectifier and controllable electrical switch coupled to form a buck converter.

7. The switched-mode DC-DC converter of claim 1, the inductor, capacitor, rectifier and controllable electrical switch coupled to form a boost converter.

8. A high-efficiency switched-mode DC-DC converter, comprising:

- a inductor;
- a capacitor coupled to the inductor;
- a rectifier coupled to the inductor and capacitor;
- first and second parallel-connected FETs coupled to the capacitor, inductor and rectifier, a switching time of said first FET being less than a switching time of the second FET; and
- a controller driving gates of the first and second FETs to turn the first FET on before the second FET during an on transition, and to turn the first FET off after the second FET during an off transition.

9. The high-efficiency switched-mode DC-DC converter of claim 8, the controller controlling the first and second FETs to produce at least one substantially regulated output voltage.

10. The high-efficiency switched-mode DC-DC converter of claim 8, the controller independently driving the gates of the first and second FETs.

11. A method of operating a switched-mode DC-DC converter, including an inductor, a capacitor coupled to the inductor, a rectifier coupled to the capacitor and inductor, and an electrical switch including first and second parallel-connected FETs coupled to the inductor the capacitor and the rectifier, a switching time of the first FET being less than a switching time of the second FET, the method comprising:

- turning the first FET on before turning the second FET on during a switch on transition; and
- turning the second FET off before turning the first FET off during a switch off transition.

* * * * *

UNITED STATES PATENT AND TRADEMARK OFFICE
CERTIFICATE OF CORRECTION

PATENT NO.     : 6,825,641 B2
DATED          : November 30, 2004
INVENTOR(S)    : Pigott, John M.

It is certified that error appears in the above-identified patent and that said Letters Patent is hereby corrected as shown below:

Column 8,
Line 47, please delete "second FET" and insert -- first FET --.

Column 9,
Line 9, please delete "a inductor" and insert -- an inductor --.

Column 10,
Line 12, please delete "the inductor the capacitor" and insert -- the inductor, the capacitor --.

Signed and Sealed this

Twenty-second Day of March, 2005

JON W. DUDAS
*Director of the United States Patent and Trademark Office*